United States Patent
Sheidler et al.

(10) Patent No.: US 6,932,849 B2
(45) Date of Patent: Aug. 23, 2005

(54) SERVICEABLE VORTEX-TYPE FILTER ASSEMBLY AND METHOD FOR SERVICING SAME

(75) Inventors: Alan David Sheidler, Moline, IL (US); Benjamin Max Lovett, Rock Island, IL (US); Yong Ho Park, East Moline, IL (US)

(73) Assignee: Deere & Company, Moline, IL (US)

( * ) Notice: Subject to any disclaimer, the term of this patent is extended or adjusted under 35 U.S.C. 154(b) by 129 days.

(21) Appl. No.: 10/627,321

(22) Filed: Jul. 24, 2003

(65) Prior Publication Data

US 2005/0016138 A1 Jan. 27, 2005

(51) Int. Cl.[7] .............................................. B01D 45/12
(52) U.S. Cl. .............................. 55/347; 55/348; 55/457
(58) Field of Search .......................... 55/347, 348, 457

(56) References Cited

U.S. PATENT DOCUMENTS

| | | | | |
|---|---|---|---|---|
| 2,341,087 A | | 2/1944 | Dunham | 183/83 |
| 4,407,663 A | * | 10/1983 | Hawley | 55/347 |
| 4,537,608 A | * | 8/1985 | Koslow | 55/337 |

* cited by examiner

Primary Examiner—Robert A. Hopkins

(57) ABSTRACT

A vortex-type filter assembly comprising a housing, a removable inlet module, and a removable outlet module. The housing comprises an inlet portion, a filtration chamber, and an outlet portion. The inlet module separates the inlet portion from the filtration chamber, and has one or more vortex generating inlet passages. The outlet module separates the filtration chamber from the outlet portion, and has one or more outlet passages. There is one outlet passage cooperating with every one inlet passage for filtering debris from the fluid. One or both of inlet module and the outlet module may be removed to facilitate servicing of the filter assembly.

20 Claims, 5 Drawing Sheets

SERVICEABLE VORTEX-TYPE FILTER ASSEMBLY AND METHOD FOR SERVICING SAME

FIELD OF THE INVENTION

The present invention relates to vortex-type fluid filters, and more specifically, a filter assembly with removable working modules.

BACKGROUND OF THE INVENTION

Vortex-type filters are well known and used extensively for filtering fluids, including both liquids and gases. These filters are advantageous because they provide high separation efficiency with minimal pumping losses. Vortex-type filters can be used in a variety of applications, such as separating debris from fluids, separating heavier fluids from lighter fluids, separating particulates from gases, or separating liquid fluids from gas fluids.

A vortex-type filter essentially comprises a vortex generating inlet passage, and a cooperating outlet passage. Both passages may be cylindrical or somewhat conical, and are axially aligned to one another. The entrance of the outlet passage is smaller than the exit of the inlet passage, and is located proximate to the exit of the inlet passage. The passages extend within a filtration chamber that is separated from the entrance of the inlet passage and the exit of the outlet passage. From this filtration chamber, the separated material is drawn by an external source though an aspiration port, or a scavenge port. Such filters are typically packaged within a housing, either individually or in groups, to form a filter assembly that can be used to filter fluids in machinery or power equipment.

In operation, unfiltered fluid enters the inlet passage, where a vortex motion is imparted in the fluid flow. The heaver material in the flow, be it fluid or debris, is thrown radially outward toward the inlet passage walls by the centrifugal force of the vortex motion. Thus, the flow is separated into a lighter portion at the center of the inlet passage, and a heavier portion near the wall of the inlet passage. As the fluid exits the inlet passage, the heaver "separated" portion flows past the entrance of smaller outlet passage and into the filtration chamber, while the lighter "filtered" portion enters and flows through the outlet passage.

In an application such as a work vehicle, filter assemblies having many vortex-type filters are commonly used to "pre-filter" debris from air entering the engine air filter. An example of such an application is an agricultural harvester, where the operating environment may be filled with high levels of dust and plant material being generated from the harvesting machinery. In this example, air is drawn into the inlet passages by the suction of the engine. The heavier dust and plant materials are separated-out and flow into the filtration chamber of the filter assembly, while clean air flows through the outlet passages and on towards the engine. The separated material is then drawn from the filtration chamber of the filter assembly, through the scavenge port, and into exhaust flow of the engine.

With the scavenging method described, the filtration chamber of the filter assembly is continually self-cleaning. As such, the typical vortex-type filter assembly is a sealed unit and does not allow for manual cleaning. Thus, when the scavenge method becomes ineffective and the filtration chamber becomes plugged with separated material, or when the passages themselves become plugged with material, the filter assembly must be replaced. Normally, filter assembly replacement is required infrequently.

However, under certain operating conditions with an agricultural harvester, particularly when harvesting safflower, both the passages and filtration chamber are highly prone to plugging with plant material. Additionally, under certain operating conditions where the air and/or debris are high in moisture, the filtration chamber is highly prone to become caked with moist separated material, which can harden into a brick under heating by the engine. Filter assembly replacement may be frequently required under these and similar conditions. The high cost and amount of downtime attributed to frequent replacement of the filter assembly is very undesirable.

SUMMARY OF THE INVENTION

The present invention is a vortex-type filter assembly with removable working modules for servicing. The filter assembly of the illustrated embodiment comprises a housing having an inlet portion, an outlet portion, and a filtration chamber. Extending from the housing, proximate the filtration chamber, is a scavenge port. Arranged within the housing are several vortex-type filters that extend axially within the filtration chamber. The vortex-type filters are arranged in removable modules: an inlet module separating the inlet portion from the filtration chamber, the inlet module comprising the inlet passages, and an outlet module separating the chamber from the outlet portion, the outlet module comprising the outlet passages.

In a first illustrated embodiment, the modules are secured within the housing by a flange that mates inlet plumbing to the filter assembly. When the flange is removed, the modules are removable at the inlet portion of the filter housing. In a second illustrated embodiment, the modules are secured within the housing via an access panel, through which the modules are also removed for servicing. When closed, the access panel secures the inlet module and outlet module within the housing. With either arrangement, an operator can quickly inspect and remove one or both modules for servicing. Additionally, servicing can be completed while remaining in the operating environment without the use of special tools.

DETAILED DESCRIPTION

Figure 1:
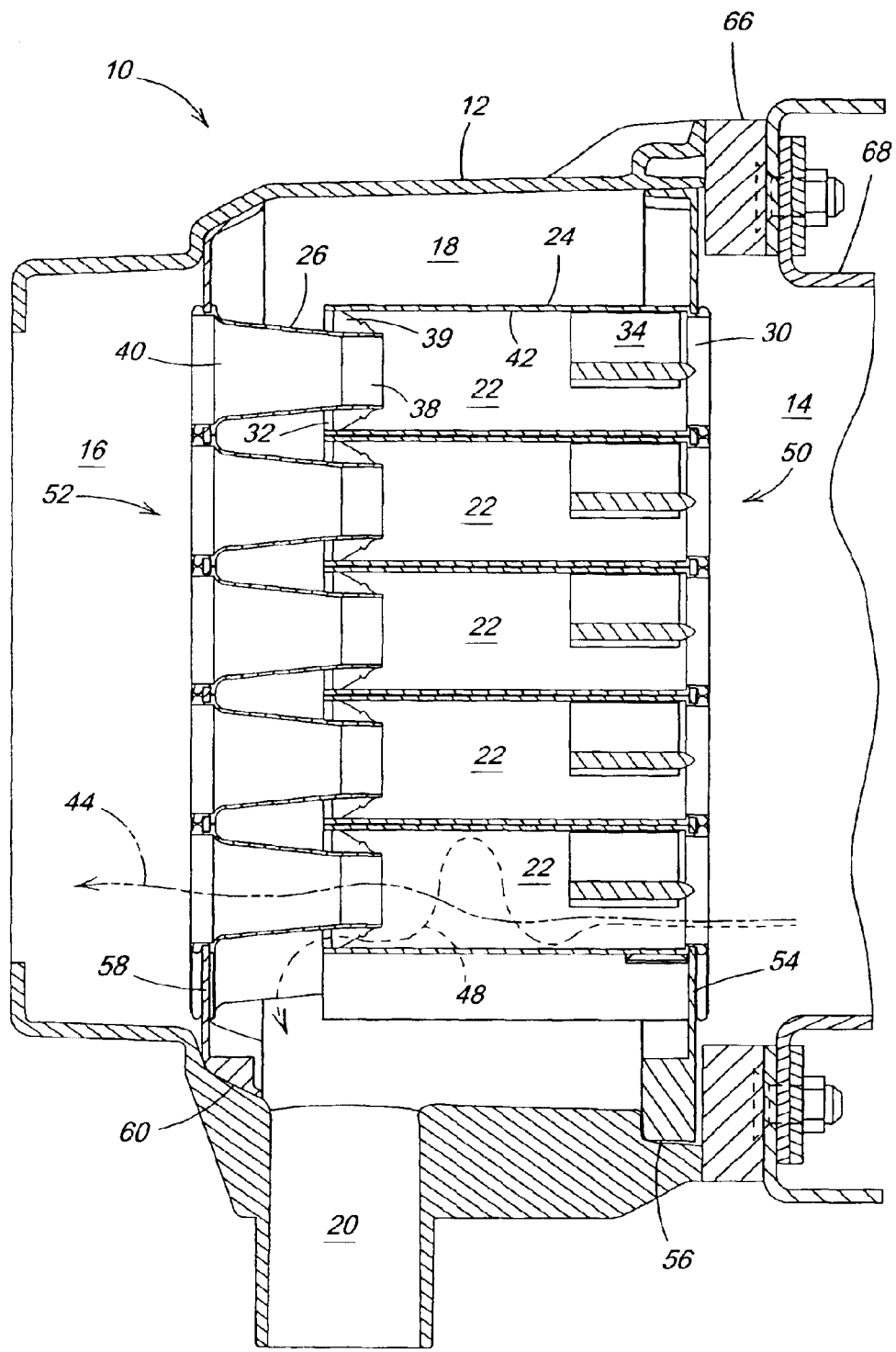
FIG. 1 is a side view of the filter assembly of the present invention.

FIG. 1 shows a first illustrated embodiment of the present invention, a vortex-type filter assembly 10 with removable working modules 50 and 52. The filter assembly 10 comprises a rectangular housing 12 having an inlet portion 14, an outlet portion 16, and a filtration chamber 18. Extending from the housing 12, proximate the filtration chamber 18, is a scavenge port 20. Unfiltered fluid enters the filter assembly 10 at the inlet portion 14. Filtered fluid is delivered from the filter assembly 10 at the outlet portion 16, while fluid containing separated material is drawn from the filter assembly 10 at the scavenge port 20. The component parts of the filter assembly 10 may be formed from a variety of suitable materials, including steel, aluminum, or engineered plastics. Although illustrated as a rectangular filter assembly, a cylindrical shape could also be used.

Arranged within the housing 12 are several vortex-type filters 22 that extend axially within the filtration chamber 18. Each vortex-type filter 22 comprises a vortex generating inlet passage 24, and a cooperating outlet passage 26. The inlet passage 24 is a cylindrical conduit having an entrance 30 open to the inlet portion 14, an exit 32 open to the filtration chamber 18, and a passage wall 42. Within the inlet passage 24 is a vortex generating vane element 34 located near the entrance 30. The outlet passage 26 is a frusto-conical conduit having an entrance 38 open to the filtration chamber 18, and tapering outwardly to an exit 40 open to the outlet portion 16. The entrance 38 of the outlet passage 26 is smaller than the exit 32 of the inlet passage 24. Corresponding inlet passages 24 and outlet passages 26 are axially aligned to each other, with the entrance 38 of each outlet passage 26 extending into the exit 32 of each corresponding inlet passage 24. In the illustrated example, alignment features 39 located at the entrance 38 of the outlet passage 26 cooperate with the inlet passage wall 42 to maintain axial alignment between each corresponding inlet passage 24 and outlet passage 26.

In operation, unfiltered fluid enters the inlet passages 24, where a vortex motion is imparted in the fluid flow within each passage. Heaver material in the flow, such as dust or debris for example, is thrown radially outward toward the inlet passage walls 42 by the centrifugal force of the vortex motion. As a result, the flow in each inlet passage 24 is separated into a lighter portion 44 at the center of the inlet passage 24, and a heavier portion 48 near the wall 42 of the inlet passage. As the fluid exits the inlet passage 24, the heaver "separated flow" portion 48 flows past the entrance 38 of smaller outlet passage 26 and into the filtration chamber 18, while the lighter "filtered flow" portion 44 enters and flows through the outlet passage 26. The separated flow disperses within filtration chamber 18, and continues out through the scavenge port 20.

Under typical operating conditions, some of the material suspended within the separated flow may fall-out as the flow disperses within the filtration chamber 18. Over time, this material may accumulate within the filtration chamber 18, tending to restrict flow through the filtration chamber 18, and diminishing the efficiency of the filter assembly 10. In operating conditions where the unfiltered fluid is laden with such material, the accumulation may be rapid, prompting frequent replacement of the filter assembly 10. In extreme conditions, the inlet passages 24 may become plugged with such material, causing the flow through the filter assembly 10 to be greatly restricted, and prompting frequent replacement of the filter assembly 10.

Figure 2:
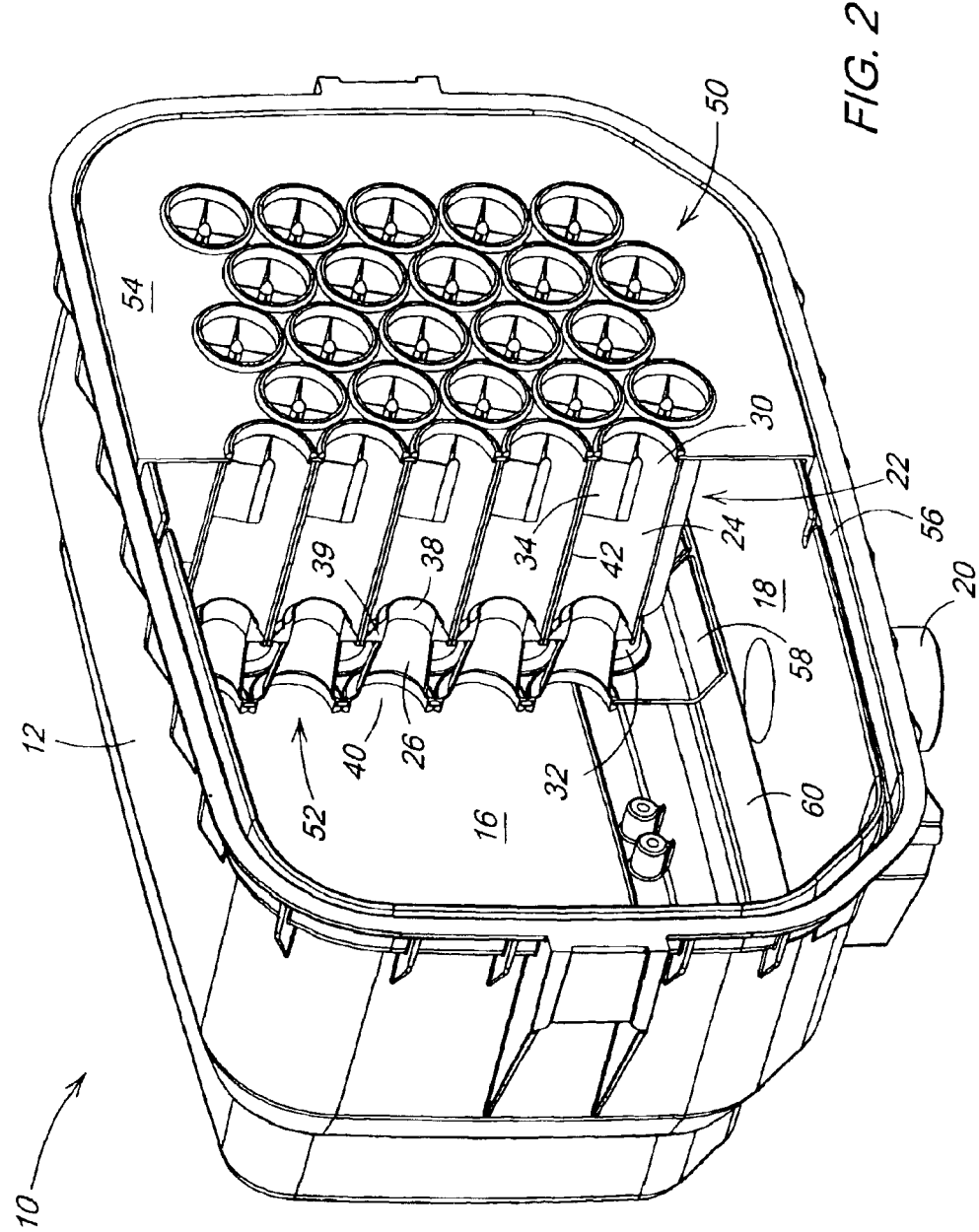
FIG. 2 is a perspective section view illustrating a first embodiment for a filter assembly of the present invention.

FIG. 2 shows a perspective view of the first illustrated embodiment, where the vortex-type filters 22 are arranged as two removable modules: an inlet module 50 separating the inlet portion 14 from the filtration chamber 18, the inlet module 50 comprising the inlet passages 24, and an outlet module 52 separating the filtration chamber 18 from the outlet portion 16, the outlet module 52 comprising the outlet passages 26. In this illustrated embodiment, the inlet module 50 is formed by a plate 54 to which are attached the inlet passages 24. The plate 54 seals the inlet portion 14 from the filtration chamber 18, and is positioned within the housing 12 by locating and orienting features 56. Likewise, the outlet module 52 is formed by a plate 58 to which are attached the outlet passages 26, the outlet plate 58 sealing the filtration chamber 18 from the outlet portion 16, and being positioned within the housing 12 by locating and orienting features 60. It should be noted that features 56 and 60 serve to ensure proper longitudinal alignment between the inlet passages 24 of the inlet module 50, and the corresponding outlet passages 26 of the outlet module 52.

In the first illustrated embodiment, snap features 61 are provided to secure the outlet module 52 within the housing 12. The inlet module 50 is secured within the housing 12 by a flange 66 that mates inlet plumbing 68 to the filter assembly 10. In this embodiment, the flange 66 is secured to the filter assembly 10 by one or more over-center latches 70, but could also be secured by other means, such as fasteners or joint clamps. It should be appreciated however, that in the arrangement illustrated utilizing over-center latches 70, the inlet module 50 and the outlet module 52 may be removed for servicing without using special tools. It should also be noted that this arrangement could be executed in the alternative, with the outlet module 52 being held in place by a flange connecting outlet plumbing, or with the inlet module 50 being secured within the housing by snap features.

Figure 3:
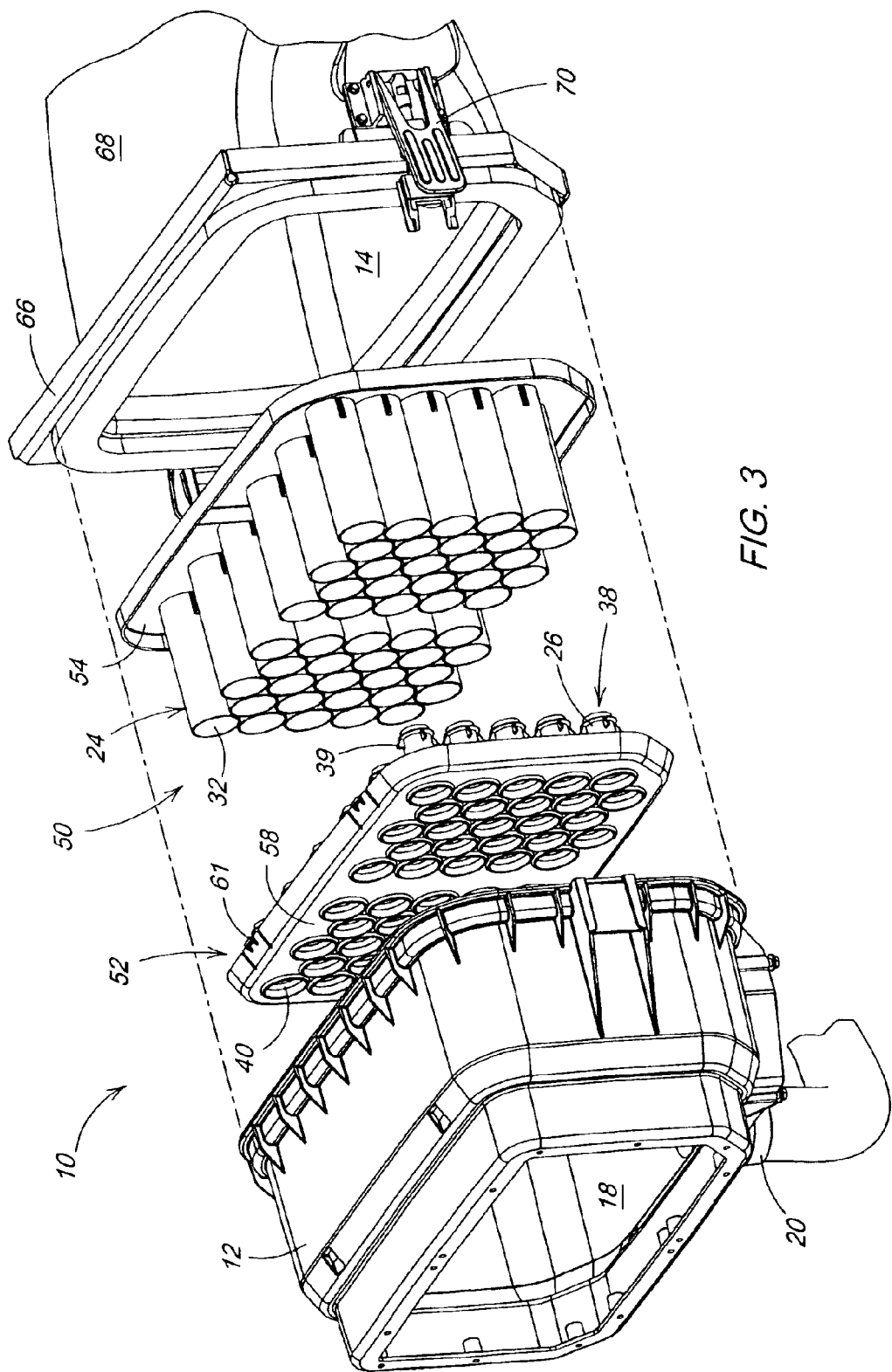
FIG. 3 is a perspective view for the first embodiment of the filter assembly shown with the inlet module and outlet module removed for servicing.

FIG. 3 shows a perspective view of the first illustrated embodiment with the inlet module 50 and the outlet module 52 removed for servicing. To service, an operator must first discontinue operation with the filter assembly 10. Once operation has stopped and it is safe to proceed, the operator may service the filter assembly 10 by unlatching the over-center latches 70 and separating the flange 66 of the inlet plumbing 68 from the filter assembly 10, to reveal the inlet module 50. Next, the operator must remove the inlet module 50, pulling it away from the housing 12, to reveal the filtration chamber 18. If the operator determines that cleaning of the filtration chamber 18 or the working modules 50 and 52 is required, the operator may employ several methods of cleaning to remove debris, including manual wiping of the modules 50 and 52 and the chamber 18, shaking of the inlet modules 50', or blowing the modules 50 and 52 and chamber 18 with compressed air. It is noteworthy that with this arrangement, that although the outlet module 52 is removable, it does not need to be removed from the housing 12 for clean-out. In this way, the outlet portion 16, which is normally substantially clean, goes undisturbed during service, such that the risk of introducing debris downstream of the filter assembly 10 is minimized.

Once the modules 50, 52 and filtration chamber 18 are clean, the operator may insert the inlet module 50 back into the filter assembly 10. In this illustrated embodiment, the shape of the housing 12 serves as the location and orientation features 56 for the positioning the inlet module 50 within the housing 12, allowing for only one possible installation arrangement. Once the inlet module 50 is in place, the operator mates the flange 66 of the inlet plumbing 68 to the filter assembly 10, and latches them together with the over-center latches 70, securing the inlet module 50 within the filter housing 12. Once the re-assembly process is completed, the operator may resume operation.

Figure 4:
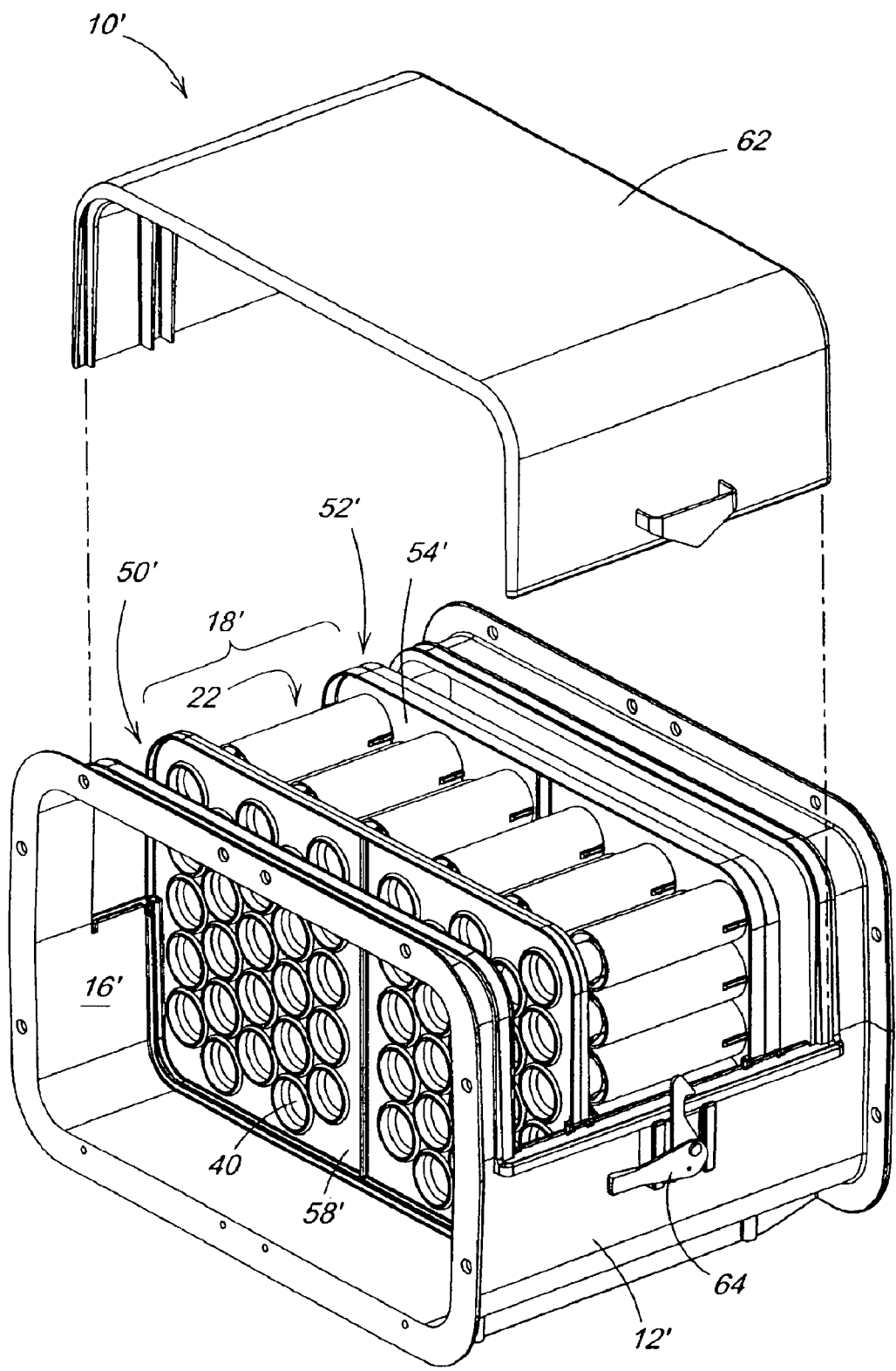
FIG. 4 is a perspective view illustrating a second embodiment for a filter assembly of the present invention.

FIG. 4 shows a perspective view of a second illustrated embodiment of a filter assembly 10' having a housing 12' and filtration chamber 18'. An inlet module 50', and an outlet module 52' are secured within the housing 12' via an access panel 62, through which the modules 50' and 52' are also removed for servicing. The access panel 62 in this embodiment is removably attached to the housing 12' with one or more over-center latches 64. When closed, the access panel 62 secures the inlet module 50' and outlet module 52' within the housing 12'. With this arrangement, an operator can quickly inspect and remove the modules 50' and 52' from the housing 12' while remaining in the operating environment, without the use of special tools, and without disturbing any plumbing connected to the filter assembly 10'.

Figure 5:
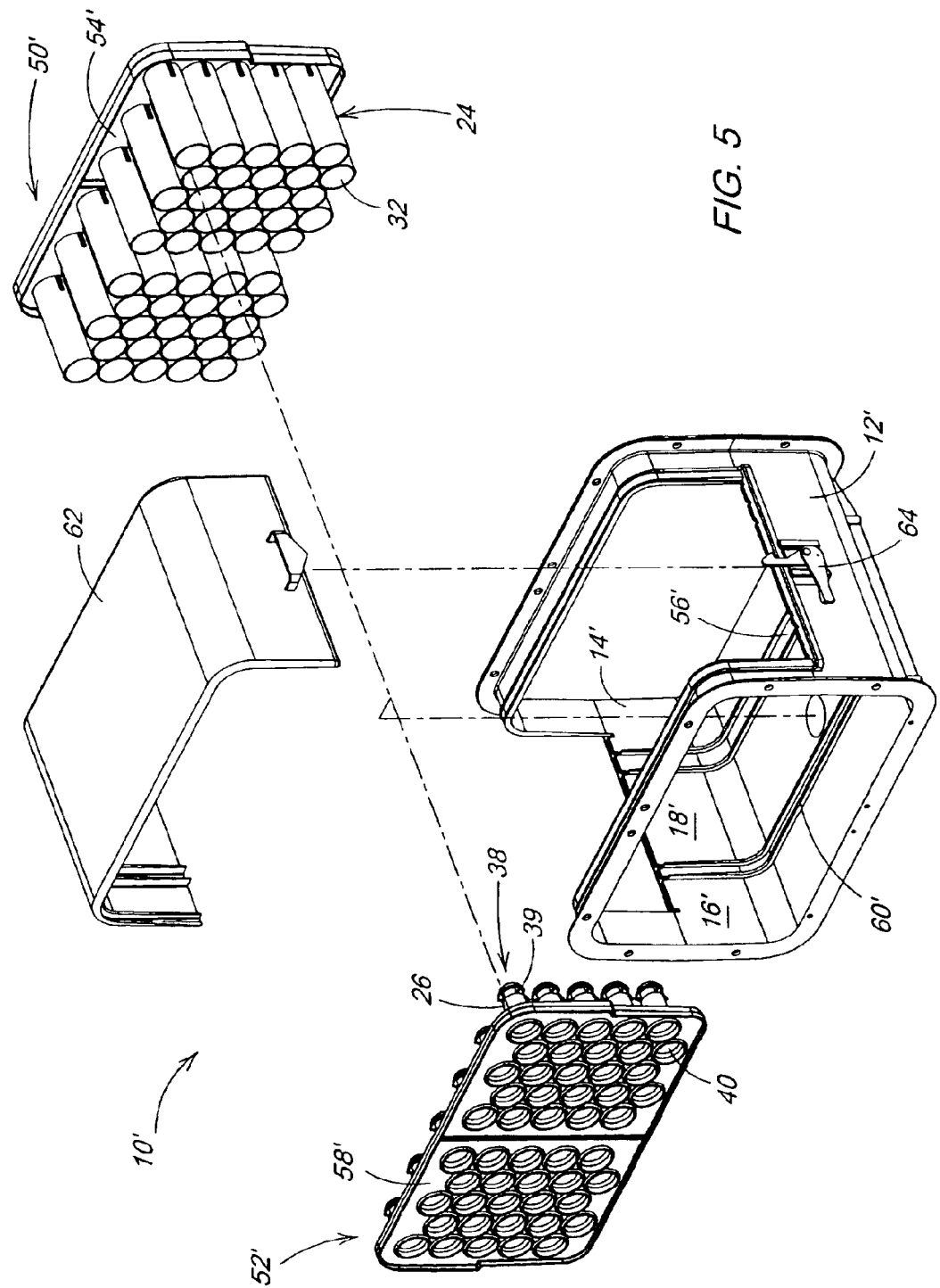
FIG. 5 is a perspective view for the second embodiment of the filter assembly with the inlet module and outlet module removed for servicing.

FIG. 5 shows a perspective view of the second illustrated embodiment with the inlet module 50' and the outlet module 52' removed for servicing. To service, an operator must first discontinue operation with the filter assembly 10'. Once operation has stopped and it is safe to proceed, the operator may service the filter assembly 10' by unlatching the over-center latches 64 and opening the access panel 62 to reveal the working modules 50' and 52' of the filter assembly 10'. If the operator determines that the filtration chamber 18' or passages in the modules 50' and 52' need to be cleaned out, he may remove both the inlet module 50' and outlet module 52' together from the filter assembly 10'. Once removed, the inlet module 50' and outlet module 52' may be separated from each other, and both may be cleaned. The operator may employ several methods of cleaning to remove debris, including manual wiping of the modules 50' and 52', shaking of the modules 50' and 52', or blowing the modules 50' and 52' with compressed air. The operator may also clean-out the filtration chamber 18' of filter housing 12' while the modules 50' and 52' are removed.

Once the modules 50' and 52' and filtration chamber 18' are clean, the operator may re-assemble the modules 50' and 52' back into the filter assembly 10'. First, the operator must insert the entrances 38 of the outlet passages 26 of the outlet module 52' into the exits 32 of the corresponding inlet passages 24 of the inlet module 50'. Next, the operator places the modules 50' and 52' together into the filter assembly 10', positioning the modules 50' and 52' with location and orientation features 56' and 60' in the housing 12'. Finally, the operator closes the access panel 62 and latches the over-center latches 64, securing the modules 50' and 52' within the housing 12'. Once the re-assembly process is completed, the operator may resume operation. It should be noted that features 56' and 60' serve to ensure proper longitudinal alignment between the inlet passages 24 of the inlet module 50', and the corresponding outlet passages 26 of the outlet module 52'.

Having described the illustrated embodiments, it will become apparent that various modifications can be made without departing from the scope of the invention as defined in the accompanying claims.

What is claimed is:

1. A vortex-type filter assembly comprising:
    a housing having an inlet portion, a filtration chamber downstream from the inlet portion, and an outlet portion downstream from the filtration portion;
    an inlet module removably secured within the housing, separating the inlet portion from the filtration chamber, the inlet module having a vortex generating inlet passage through which a fluid flows from the inlet;
    an outlet module removably secured within the housing, separating the filtration chamber from the outlet portion, the outlet module having an outlet passage through which the fluid flows to the outlet portion, the outlet passage cooperating with the inlet passage for filtering debris from the fluid.

2. The vortex-type filter assembly described in claim 1 wherein the inlet module and outlet module is removable through the inlet portion of the housing.

3. The vortex-type filter assembly described in claim 2 wherein the inlet module is secured within the housing by a flange removably attached at the inlet portion of the housing.

4. The vortex-type filter assembly described in claim 3 wherein the inlet module further comprises an inlet plate separating the inlet portion from the filtration chamber, and the outlet module further comprises an outlet plate separating the filtration chamber from the outlet portion.

5. The vortex-type filter assembly described in claim 4 wherein the flange is removably attached to the housing by at least one over-center latch.

6. The vortex-type filter assembly described in claim 5 wherein the inlet module comprises a plurality of vortex generating inlet passages, and the outlet module comprises a plurality of outlet passages, there being one outlet passage cooperating with every one inlet passage for filtering debris from the fluid.

7. The vortex-type filter assembly described in claim 6 wherein the fluid is air.

8. The vortex-type filter assembly described in claim 1 wherein the inlet module and the outlet module are removable through an access panel removably attached to the housing.

9. The vortex-type filter assembly described in claim 8 wherein the inlet module and the outlet module are removably secured within the housing by the access panel.

10. The vortex-type filter assembly described in claim 9 wherein the inlet module further comprises an inlet plate separating the inlet portion from the filtration chamber, and the outlet module further comprises an outlet plate separating the filtration chamber from the outlet portion.

11. The vortex-type filter assembly described in claim 10 wherein the access panel is removably attached to the housing by at least one over-center latch.

12. The vortex-type filter assembly described in claim 11 wherein the inlet module comprises a plurality of vortex generating inlet passages, and the outlet module comprises a plurality of outlet passages, there being one outlet passage cooperating with every one inlet passage for filtering debris from the fluid.

13. The vortex-type filter assembly described in claim 12 wherein the fluid is air.

14. A vortex-type filter assembly comprising:
    a housing having an inlet portion, a filtration chamber downstream from the inlet portion, and an outlet portion downstream from the filtration portion;
    an inlet module removably secured within the housing, separating the inlet portion from the filtration chamber, the inlet module having a vortex generating inlet passage through which a fluid flows from the inlet, the inlet module being removable through the inlet portion;
    an outlet module removably secured within the housing, separating the filtration chamber from the outlet portion, the outlet module having an outlet passage through which the fluid flows to the outlet portion, the outlet passage cooperating with the inlet passage for filtering debris from the fluid, the outlet module being removable through the inlet portion;
    a flange adapted to removably secure the inlet module within the housing, the flange removably attached to the housing at the inlet portion.

15. The vortex-type filter assembly described in claim 14 wherein the inlet module further comprises an inlet plate separating the inlet portion from the filtration chamber, and the outlet module further comprises an outlet plate separating the filtration chamber from the outlet portion.

16. The vortex-type filter assembly described in claim 15 wherein the inlet module is secured within the housing by a flange removably attached at the inlet portion of the housing.

17. The vortex-type filter assembly described in claim 16 wherein the inlet module comprises a plurality of vortex generating inlet passages, and the outlet module comprises a plurality of outlet passages, there being one outlet passage cooperating with every one inlet passage for filtering debris from the fluid.

18. The vortex-type filter assembly described in claim 17 wherein the fluid is air.

19. A method for servicing a vortex-type filter assembly, the vortex-type filter assembly comprising a housing, an inlet module, an outlet module, and a removable flange, the housing having an inlet portion, a filtration chamber downstream from the inlet portion, and an outlet portion downstream from the filtration portion, the inlet module separating the inlet portion from the filtration chamber, being removably secured within the housing, and having a vortex generating inlet passage through which a fluid flows from the inlet portion, the outlet module separating the filtration chamber from the outlet portion, and having an outlet passages through which the fluid flows to the outlet portion, the outlet passage cooperating with the inlet passage for filtering debris from the fluid, the flange being adapted to removably secure the inlet module within the housing, the inlet module being removable through the inlet portion of the housing, the flange being removably attached to the housing with a latch, the method comprising:

unlatching the latch;

separating the flange from the filter housing;

removing the inlet module from the filter housing;

cleaning the inlet module, filtration chamber, and outlet module;

inserting the inlet module back into the filter housing;

mating the flange to the filter housing;

latching the latch.

20. A method for servicing a vortex-type filter assembly, the vortex-type filter assembly comprising a housing, an inlet module, an outlet module, and an access panel, the housing having an inlet portion, a filtration chamber downstream from the inlet portion, an outlet portion downstream from the filtration portion, an inlet module position feature, and an outlet module position feature, the inlet module separating the inlet portion from the filtration chamber, being removably secured within the housing, and having a vortex generating inlet passage through which a fluid flows from the inlet portion, the outlet module separating the filtration chamber from the outlet portion, being removably secured within the housing, and having an outlet passage through which the fluid flows to the outlet portion, the outlet passage cooperating with the inlet passage for filtering debris from the fluid, the access panel adapted to removably secure the inlet module and the outlet module within the housing, through which the inlet module and the outlet module are removable, the access panel being removably attached to the housing with a latch, the method comprising:

unlatching the latch;

opening the access panel to reveal the filtration chamber;

removing the inlet module and outlet module together from the housing;

separating the inlet module and outlet module from one another;

cleaning the inlet module, outlet module, and filtration chamber;

inserting the outlet passage into the corresponding inlet passage;

placing the inlet module and the outlet modules together into the housing;

aligning the inlet module with the inlet module position feature;

aligning the outlet module with the outlet module position feature;

closing the access panel on the housing;

latching the latch.

\* \* \* \* \*